United States Patent Office 3,458,596
Patented July 29, 1969

3,458,596
SYNTHETIC MATERIAL FOR BEARINGS AND OTHER MACHINE ELEMENTS, CONTAINING POLYAMIDES AND POLYOLEFINS
Heinz Faigle, Saegenkanal 15, Hard-Vorarlberg, Austria
No Drawing. Filed Jan. 27, 1965, Ser. No. 428,553
Int. Cl. C08g 41/04
U.S. Cl. 260—857       5 Claims

ABSTRACT OF THE DISCLOSURE

An improved synthetic bearing material that combines desirable properties of friction and wear and methods for its manufacture are disclosed. The bearing material is comprised of discrete particles of polyolefins held in a polyamide matrix. The particulate nature of the polyolefin is preserved and its homogenization with the polyamide is prevented by selected polyolefins of high molecular weight and high melt viscosities.

---

The present invention generally relates to synthetic resinous materials that have improved resistance to wear, greater resistance to abrasion, and reduced cofficients of friction. More particularly, this invention is concerned with the use of polyolefins as fillers in other synthetic resinous materials and methods for their incorporation therein.

The use of filler materials to alter the physical properties of plastics is well known. For example, inorganic fillers such as graphite or molybdenum disulfide may be added to polyamides in order to increase the crystallinity of the polyamide and to provide the polyamide with a self-contained or captive lubricant. By these means, the resistance to abrasion and wear of the polyamide is materially improved. Chopped fibers, such as of glass, may also be useful fillers for various plastics when improvements in the strength of the plastic, such as tensile, impact, or compressive strength, are desired.

Certain polyolefins, and particularly polyethylene, have sometimes been proposed as fillers for other plastic materials due to their low coefficient of friction and ability to so increase the wear life of the other plastic. Unfortunately, prior efforts to use the polyolefins as fillers for other plastics have not been entirely satisfactory since such additions tend to reduce the strength of the other plastic materials. Accordingly, these plastic materials filled with polyolefins may fail in service when placed under tensile, impact, and tortional forces that normally could be withstood by the unfilled plastic.

It has now been discovered that it is possible to include polyolefins as fillers in various plastic materials in order to improve the resistance to abrasion, wear, and frictional characteristics while simultaneously preserving, to a great degree, the essential strength characteristics of the unfilled material.

Accordingly, it is an object of this invention to reduce the coefficient of friction of plastic materials.

A further object of this invention is to increase the abrasion resistance and wear life of various plastic materials.

Yet a further object of this invention is to reduce the coefficient of friction of various plastic materials without material impairment of their physical strength.

Still a further object of this invention is to provide methods and means whereby polyolefins, and particularly polyethylene, may be incorporated as fillers into various plastic materials in a manner that will improve the abrasion resistance and frictional properties of such plastics without materially reducing the strength properties of the plastics.

Briefly, these and other objects of this invention are achieved by preserving the entity of the polyolefin particles during the mixing operation so that the finished product will contain a plurality of identifiable, discrete particles of the polyolefin. Further, these results are obtained with greatest facility when the higher molecular weight polyolefins are used, although this is not always essential in the practice of this invention as will become clear from the following more detailed description of this invention.

In the past, when polyethylene was added to other plastics as a filler, it was assumed that it was quite important to obtain as nearly a homogenous mixture of the two resinous materials as possible. To achieve this result, kneading extruders and other high shear mixing devices were utilized to melt and homogenize the two plastics together. While it is true that polyethylene will not form a true solution with most molten resins, high shear mixing devices will emulsify or otherwise so thoroughly mix the components that the discrete particles of polyethylene will be destroyed. This homogenization may be so intensive that the particles of polyolefin will approach monomolecular sizes and be visible only with the aid of electron microscopes. For convenience of description herein, this type of melt mixing of polyolefins with various plastics is referred to as "homogenization" and as resulting in a "homogeneous structure" though it will be understood that these terms are relative and not absolute since at least molecular sized particles of the polyolefins will usually remain.

As has been mentioned above, it has now been discovered that the frictional characteristics and wear properties of plastics can be improved without material sacrifice of other physical properties if polyethylene and other polyolefins are added to the plastic in such a manner that discrete, identifiable particles of the polyethylene remain after the mixing operation. This requires first that no homogenization take place, and second, that excessive agglomeration of the polyethylene particles themselves be prevented in order that the polyethylene particles neither become fused together in large masses nor smeared out into stratifications or layers throughout the plastic matrix. Generally, and without regard to specific conditions of use, it may be stated that the average particle size of the polyethylene particles, after addition to and mixing with the plastic matrix, should not be less than about 0.01 mm. There is no precise critical upper limit to this particle size, and it has been observed that agglomerates or particles as large as 2 or 3 mm. are quite effective in reducing the coefficient of friction and improving the wear of the plastic material. It can be appreciated that the optimum size of the polyethylene particles will depend to a great extent on the end use made of the plastic material. For example, it may be assumed that if the plastic is used as a bearing for a comparatively small smooth shaft, the optimum particle size of polyethylene filler will be less than if a comparatively large bearing for use with a relatively rough shaft is used.

As polyethylene has a comparatively low melting point, considerably below that of the long-wearing plastics commonly used as bearing materials, such as polyamides and polyacetals, it has proved extremely difficult to prevent homogenization of the polyolefins in these plastics during mixing operations which almost without exception, must take place above the melting point of the polyethylene. It has been discovered, however, that homogenization and excessive agglomeration may be prevented especially when the melted materials are subjected to shear forces, if the melt viscosity of the polyethylene is generally greater than that of the base material, and particularly when this viscosity is sufficiently high to resist the forces of shear encountered in the mixing operation. As the melt viscosity of polyethylene is directly related to its molecular weight, these higher melt viscosities can be obtained by utilizing the high molecular weight polyethylenes, such as those having molecular weights in excess of 500,000.

Due to this relatively higher melt viscosity, the high molecular weight polyethylenes may be melt mixed with other resinous materials, even where high shear forces are encountered, without undue homogenization or agglomeration. It should be understood, however, that a degradation in the molecular weight and a reduction in melt viscosity of polyethylene takes place at elevated temperatures. Accordingly, the mixing operation should be discontinued prior to the time the melt viscosity of the polyethylene approaches too closely the viscosity of the base material.

As a general proposition, it may be stated that the more severe the conditions of shear and temperature encountered in the mixing operation, the higher should be the molecular weight of the polyethylene. These conditions depend upon the type of operation in which the polyethylene is mixed with the base material. For example, at one extreme, extrusion and injection molding processes will subject the mixture to both high shear forces and high temperatures, and thus require relatively high moleculer weight polyethylenes to prevent homogenization. At the other extreme, low temperature anionic polymerization processes for lactams make it possible to cast polyethylene-filled polylactams without any shear forces at temperatures approaching and sometimes even below the melting point of the polyethylene. In this instance, only low to medium molecular weight polyethylenes need be used. Lying between these two extremes, there are other processing techniques such as, for example, pressing and sintering, where the temperatures are more moderate than those encountered in extrusion, and the shear forces are negligible.

In selecting the polyethylene, after a suitable molecular weight has been determined, it is preferred to utilize polyethylenes having particle sizes between about 0.01 and 0.8 mm. that have irregular shape and form so that a multiplicity of anchor points are presented to firmly embed the particles into the plastic matrix. In addition to providing for such physical embedment of the filler into the matrix, it is also possible to establish chemical bonds between the surface of the polyethylene particles and the base material. This may be accomplished, for example, by the use of selected bonding agents that will cause polar and/or chemical bonds to be developed. Also, in the case of polyolefins, its chemical bonding characteristics often may be beneficially modified by oxidizing the surface of the particles.

The preferred base material is selected from plastics that have high strength useful in the fabrication of various components for machines, such as bearings, gears, and the like. As previously mentioned, the best known such materials are the polyamides and the polyacetals. Particularly useful in the practice of this invention are the film-forming polyamides selected from the class consisting of polyhexamethylene sebacamide, polycaprolactam, and the polymer of omega-amino-undecanoic acid.

The ratio of the weight of the filler to the base material is not critical, though ratios of about 2:3 to about 1:1 generally should not be exceeded. The selection of the optimum ratio will necessarily depend upon the intended end use of the product in order to provide the desired strength, hardness, wear, abrasion, friction, and other properties to the product. In a preferred form, the filler is present in an amount between about 3 to 20% by weight, and the base material in an amount between about 80 to 97% by weight.

The mixture of the filler to the base material may take place at any time during the manufacturing process or, if desired, this mixture may be achieved simultaneously with the forming operation such as where the components are in the melt state within the extruder or injection molding machine or similar apparatus. However, as previously mentioned, if such a process utilizes an extruder or an injection machine, it is necessary to utilize a polyethylene having a melt viscosity higher than the base material.

One particular advantage of material prepared in the above manner lies in the fact that both the filler and base materials are both synthetic resinous materials, and thus meet the requirement for an all synthetic bearing. The polyethylene serves as a captive solid lubricant whereby new particles of lubricant are exposed at the surface as the base material is abraded or worn down. Thus, the demand for a self-lubricating bearing is satisfied. Also, the polyethylene particles will, in operation, tend to fill the pores and other surface irregularities of metal shafts or bearings. By forming a film on the shaft, they reduce considerably the wear and abrasion both to the shaft and the bearing. At the same time, an improvement in the coefficient of friction is observed in most cases.

A further advantage from utilizing polyolefins can be seen from the fact that, as previously mentioned, they will melt at temperatures lower than that of the base material. For this reason, if a bearing should heat up during operation, the temperature will reach the melting point of the polyolefin first, and the particles near the surface will melt to form a liquid lubricating film which in turn will reduce the friction and reduce the further conversion of mechanical energy into heat.

A particular advantage for using higher molecular weight polyolefins is obtained since their higher melt viscosity or high melt shear strength, as compared to the synthetic materials in which they are added, will inhibit a complete dissolving or melting away of these polyolefins despite their lower melting point.

The material which is the subject of this invention can be produced by incorporating these polyolefin particles in solutions or dispersions of other synthetic material and reducing these then by drying into the solid state. In practice, however, admixing would be made during the melting of the basic synthetic material. The addition can be made either by cold mixing the polyolefin particles with the granulate or powder of the other synthetic and then bringing the mixture into the heated processing machine, or the polyolefin particles can be introduced directly into the already molten base material. It should be considered, however, that the polyolefins start already to degrade thermally when the basic synthetics used for machine elements, as polyamide and polyacetal, are reaching their melting point. The embedding in the manufacture of granulates for finished products or the processing of granulates during the manufacture of the end product has to be made in such a way that the temperature at which the thermal degradation of the polyolefins takes place will be held for the shortest time possible. It is of lesser importance if the high temperature is being held while the melt is motionless or almost so, as for instance during the cooling phase of the core of a heavy rod being extruded. Here the polyolefins are still therally degraded, and thus of lower melt viscosity, but since the molten mass is at rest, no appreciable inter-mixing between the polyolefin particles and the embedding synthetic will take place anymore.

It is therefore essential that in the manufacture of granulates or finished parts from granulates, the synthetic material should be held at the melting point—or be under thermal stress since this would require less time—no longer than would be required under the given temperature conditions to advance the thermal degradation of the polyolefins to a level where their melt viscosity (or melt shear strength) would drop to below that of the base plastic material. In the production of finished parts, this time interval may be exceeded if the molten mass is in a state of rest, or at least nearly so, and will subsequently solidify. In summary, as mentioned above, the melt viscosity of the polyolefins should be maintained sufficiently high to resist inpored forces of shear.

Example 1

100 parts by weight of polyamide-6 granulate (polycaprolactam) with a molecular weight of 70,000 were, with the addition of an adhesive agent, admixed in a drum-type mixer with 18 parts by weight of polyethylene powder (molecular weight 1,200,000 and particle size between 0.5 and 0.03 mm.) and this mixture was then further processed in a granulate extruder. The discharged melt had a temperature of 240° C., and the cords leaving the extruder had a diameter of 2 to 3 mm. and were cut into small pieces 3 to 5 mm. in length. This granulate was then further processed into small test cubes (after being dried) by means of a worm-type injection molder at a melt temperature of 250° C. In the same molder and under identical working conditions were made some test cubes of straight polyamide-6 granulate without any addition of polyethylene.

The material, both mixture and unfilled polyamide, was cut into thin slices and examined under the microscope. The examination showed that the polyethylene did not mix with the parent polyamide, but that the polyethylene had retained their uneven and irregular shape and were embedded as individual particles in the parent polyamide.

Eight test cubes of each material were machined into small bearings and the two types of bearings were tested in a bearing testing machine. The resulting mean values are given in the following table:

|  | Coefficient of friction, relative temperature at a bearing pressure of— | | | |
| --- | --- | --- | --- | --- |
|  | 15 kp./cm.² | 35 kp./cm.² | 15 kp./cm.² (° C.) | 35 kp./cm.² (° C.) |
| Polyamide without polyethylene | 0.05 | 0.17 | 20 | 57 |
| Polyamide with polyethylene | 0.04 | 0.06 | 13 | 28 |

From this table may be seen that the polyethylene admixture is particularly effective at higher bearing pressures. Actually, it was found in work tests that the allowable PV value in the range of low velocities could be increased by a multiple.

As a rather essential test result should be mentioned that with bearings made of polyamide with polyethylene additives, no creaking or squealing noise could be heard on the test stand or during work tests, not even at critical velocities, in contrast to the bearings of straight polyamide where such phenomena (caused by slip-stick effects) can be observed more frequently. The reason for this improvement may be seen in the fact, as the above table clearly indicates, that the coefficient of friction in motion is brought close to that of rest.

Example 2

Two vibrational conveyors were mounted above the intake opening of an extruder. They were so adjusted that one, handling polyethylene powder in particle sizes of 0.04 to 0.2 mm. of 1,000,000 molecular weight, would furnish 5 parts by weight, while the other, handling polyacetal granulate, would furnish 100 parts by weight. The temperature of the melt in the extruder head was 200° C. Attached to the extruder head was an extruder die for round rods of 40 mm. diameter. The extruder had, in this case, a double function. The polyethylene and the polyacetal resin reached the worm at the same time, they melted on their way to the extruder head, and the polyethylene was enveloped by the less viscous polyacetal. This mixture was then, under pressure from the worm, pushed through the extruding die and formed into a rod. Sections of this rod were tested on an abrasion tester (Abrieb machine). In this tester, the rod sections were pressed with their radial face against the cylindrical surface of a steel disc with 100 mm. diameter and 15 mm. width. A measure of abrasion was the 15 mm. wide track the disc was cutting into the frontal face of the 40 mm. diameter rod section. The circumferential velocity of the steel disc was 35 meters per minute, the "hold-to" pressure 4 Kp. In this test, it was shown that the acetal resin with polyethylene additive had, after 50 hours, a 20% smaller abrasion track surface, and after 330 hours, a 38% smaller abrasion track surface than the straight acetal resin.

I claim:

1. A composition adapted for use as a bearing material having desirable properties of friction and wear, comprising a plurality of discrete lubricant filler particles held in a matrix of tough, wear-resistant, synthetic resinous material, characterized in that the filler particles:
   are comprised of a polyolefin that is polyethylene or polypropylene,
   are present in an amount up to about 20% by weight,
   have a minimum size of about 0.01 mm., and have a molecular weight of at least about 500,000; and
   the matrix:
   is a polyamide comprised of a linear polymeric carbonamide which contains recurring carbonamide groups as an integral part of the main polymer chain separated by at least two carbon atoms, and
   is present in an amount of at least about 80%.

2. A composition according to claim 1 wherein the polyolefin is polyethylene and has a molecular weight of more than 800,000.

3. A composition according to claim 2 wherein the polyamide is polyhexamethylene adipamide, polyhexamethylene sebacamide, polycaprolactam, or the polymer of omega-amino-undecanoic acid.

4. A bearing surface comprised of the composition of claim 3.

5. A method of preparing bearings having desirable properties of friction and wear comprised of a plurality of discrete polyolefin filler particles held in a matrix of a polyamide that is a linear polymeric carbonamide which contains recurring carbonamide groups as an integral part of the main chain separated by at least two carbon atoms, comprising:
   selecting as the polyolefin a polyethylene that has a molecular weight of at least 500,000 and a particle size of from about 0.01 mm. to about 3 mm.;
   adding the polyolefin in an amount of up to 20% by weight to the polyamide;
   mixing the polyolefin and the polyamide together at temperatures in excess of the melting point of the polyamide;
   controlling the shear forces developed during mixing, in consideration of the molecular weight and melt viscosity of the polyolefin, to prevent homogenization of the polyolefin in the polyamide and to preserve the entity of the polyethylene particles; and
   cooling the mixture to form a solid composition having desirable properties of friction and wear with discrete particles of polyolefin of an average particle size of at least about 0.01 mm. held in the polyamide matrix.

References Cited

UNITED STATES PATENTS

| | | | |
|---|---|---|---|
| 3,256,362 | 6/1966 | Craubner | 260—897 |
| 3,283,036 | 11/1966 | Larson | 260—897 |
| 3,287,288 | 11/1966 | Reiling | 260—897 |
| 3,136,735 | 6/1964 | Stott | 260—857 |

FOREIGN PATENTS

| | | |
|---|---|---|
| 956,926 | 4/1964 | Great Britain. |
| 636,450 | 2/1962 | Canada. |

SAMUEL H. BLECH, Primary Examiner

PAUL LIEBERMAN, Assistant Examiner

U.S. Cl. X.R.

260—41, 78, 897

UNITED STATES PATENT OFFICE
CERTIFICATE OF CORRECTION

Patent No. 3,458,596     Dated July 29, 1969

Inventor(s) Heinz Faigle

It is certified that error appears in the above-identified patent and that said Letters Patent are hereby corrected as shown below:

Column 1, line 24: "cofficients" should read -coefficients-

Column 3, line 73: After "of" insert -polyhexamethylene adipamide-

Column 5, line 16: "inpored" should read -imposed-

SIGNED AND
SEALED
MAR 9 1971

(SEAL)
Attest:

Edward M. Fletcher, Jr.
Attesting Officer

WILLIAM E. SCHUYLER, JR.
Commissioner of Patents